(12) United States Patent
Dakemoto et al.

(10) Patent No.: US 11,738,762 B2
(45) Date of Patent: Aug. 29, 2023

(54) CONTROL DEVICE, MANAGER, METHOD, NON-TRANSITORY STORAGE MEDIUM, ACTUATOR SYSTEM, AND VEHICLE

(71) Applicant: TOYOTA JIDOSHA KABUSHIKI KAISHA, Toyota (JP)

(72) Inventors: Masumi Dakemoto, Nagoya (JP); Yoshihisa Yamada, Nagoya (JP); Kaiji Itabashi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 286 days.

(21) Appl. No.: 17/165,091

(22) Filed: Feb. 2, 2021

(65) Prior Publication Data
US 2021/0237748 A1 Aug. 5, 2021

(30) Foreign Application Priority Data
Feb. 4, 2020 (JP) .................................. 2020-017334

(51) Int. Cl.
*B60W 50/00* (2006.01)
*B60W 10/04* (2006.01)
*B60W 10/18* (2012.01)
*B60W 10/20* (2006.01)

(52) U.S. Cl.
CPC .......... *B60W 50/0098* (2013.01); *B60W 10/04* (2013.01); *B60W 10/18* (2013.01); *B60W 10/20* (2013.01); *B60W 2710/18* (2013.01); *B60W 2710/20* (2013.01)

(58) Field of Classification Search
CPC .. B60W 50/0098; B60W 10/04; B60W 10/18; B60W 10/20; B60W 2710/18; B60W 2710/20; B60W 50/06; B60W 2050/0091; B60W 10/184; B60W 30/12; B60W 2050/0096; B60W 30/06; B60W 30/09; B60W 30/14
See application file for complete search history.

(56) References Cited

U.S. PATENT DOCUMENTS

2011/0066344 A1 3/2011 Niwa et al.
2017/0029026 A1 2/2017 Okuda et al.

FOREIGN PATENT DOCUMENTS

| JP | 2011-63098 A | 3/2011 |
| JP | 2011-131839 A | 7/2011 |
| JP | 2017-030472 A | 2/2017 |

*Primary Examiner* — Alan D Hutchinson
(74) *Attorney, Agent, or Firm* — Oliff PLC

(57) ABSTRACT

A control device includes one or more processors that is configured to: receive a plurality of first requests from a driver assistance system; arbitrate the plurality of first requests; calculate a second request, which has a physical quantity different from the first request, based on an arbitration result; and distribute the second request to at least one of a plurality of actuator systems. When a difference between the second request based on a previous arbitration result and the second request based on a current arbitration result is larger than a threshold value, the one or more processors are configured to distribute a request that is a value between the second request based on the previous arbitration result and the second request based on the current arbitration result.

7 Claims, 2 Drawing Sheets

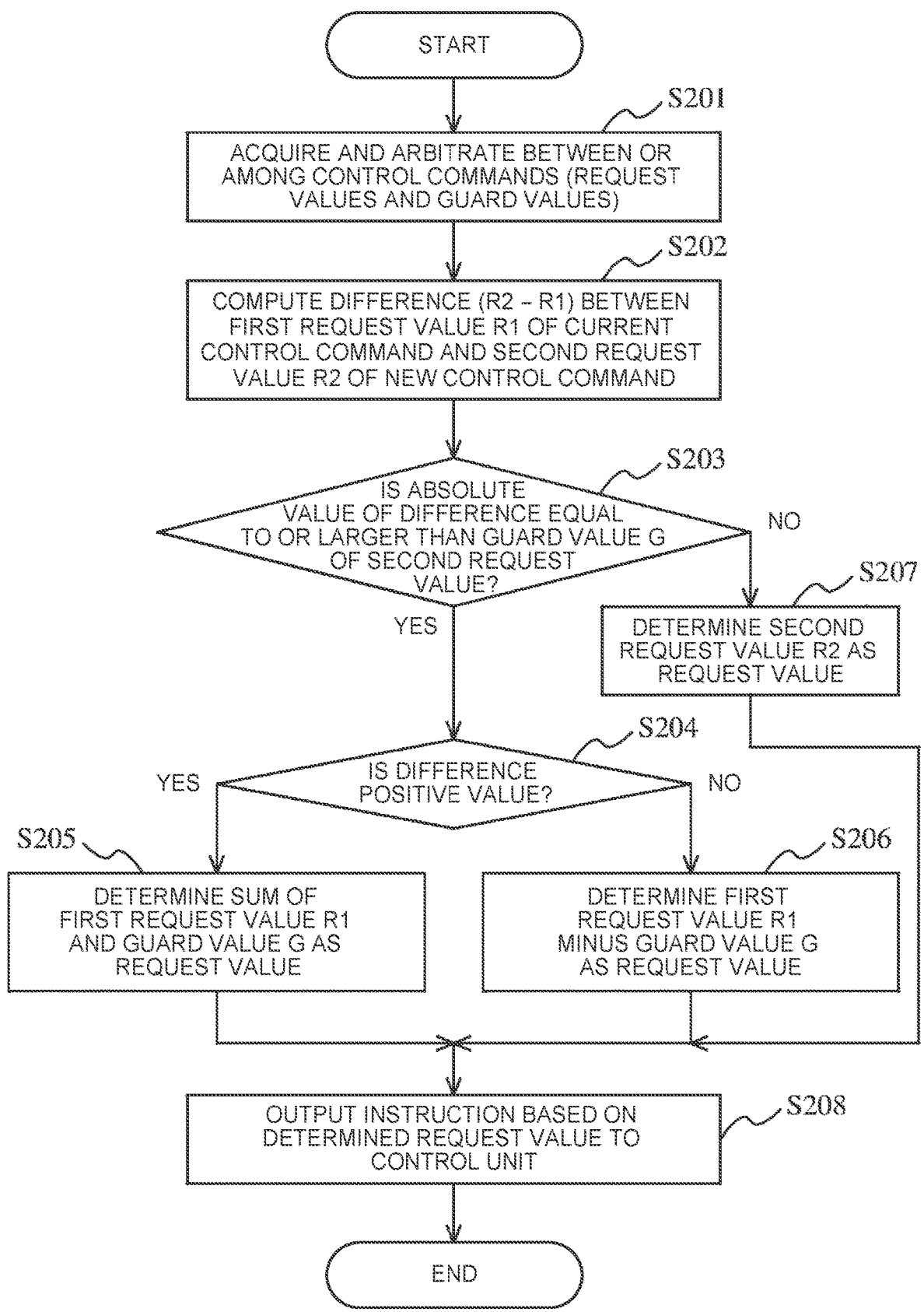

CONTROL DEVICE, MANAGER, METHOD, NON-TRANSITORY STORAGE MEDIUM, ACTUATOR SYSTEM, AND VEHICLE

CROSS-REFERENCE TO RELATED APPLICATION

This application claims priority to Japanese Patent Application No. 2020-017334 filed on Feb. 4, 2020, incorporated herein by reference in its entirety.

BACKGROUND

1. Technical Field

The present disclosure relates to a vehicle, a control device, a manager, a method, a non-transitory storage medium, and an actuator system for controlling vehicle motion.

2. Description of Related Art

Vehicles are known which arbitrate between or among a plurality of control commands for vehicle motion that occurs in the vehicle and control operation of an actuator(s) based on the arbitration results. Japanese Unexamined Patent Application Publication No. 2017-030472 (JP 2017-030472 A) discloses a device that receives a control command of a collision avoidance assist application and a control command of a lane keep assist application by an arbitration control unit and arbitrates between the plurality of control commands by the arbitration control unit.

SUMMARY

When a plurality of control commands is simultaneously received from a plurality of applications, which control command to adopt is determined according to a predetermined arbitration rule. However, when there is a large divergence between a request value requested by the new control command adopted this time by arbitration and a request value requested by an instruction based on a current control command adopted last time by arbitration, a significant change in vehicle's behavior that will make the driver feel uncomfortable may occur when the current control command is switched to the new control command and the new control command is executed.

The present disclosure provides a control device, a manager, a method, a non-transitory storage medium, an actuator system, and a vehicle which can restrain a significant change in vehicle's behavior from occurring when a current control command is switched to a new control command and the new control command is executed.

A control device mounted on a vehicle according to an aspect of the present disclosure includes one or more processors configured to: receive a plurality of first requests from a driver assistance system; arbitrate the plurality of first requests; calculate a second request, which has a physical quantity different from the first request, based on an arbitration result; and distribute the second request to at least one of a plurality of actuator systems. The one or more processors are configured to, when a difference between the second request based on a previous arbitration result and the second request based on a current arbitration result is larger than a threshold value, distribute a request that is a value between the second request based on the previous arbitration result and the second request based on the current arbitration result.

A manager mounted on a vehicle according to another aspect of the present disclosure includes one or more processors configured to: receive a plurality of kinematic plans from a plurality of ADAS applications; arbitrate the plurality of kinematic plans; calculate a motion request based on an arbitration result; and distribute the motion request to at least one of a plurality of actuator systems. The one or more processors are configured to, when a difference between the motion request based on a previous arbitration result and the motion request based on a current arbitration result is larger than a threshold value, distribute a request that is a value between the motion request based on the previous arbitration result and the motion request based on the current arbitration result. According to another aspect of the present disclosure provides a vehicle on which the manager is mounted.

A manager mounted on a vehicle according to another aspect of the present disclosure includes one or more processors configured to: receive a plurality of first requests from a plurality of ADAS applications; arbitrate the plurality of first requests; calculate a second request, which has a physical quantity different from the first request, based on an arbitration result; and distribute the second request to at least one of a plurality of actuator systems. The one or more processors are configured to, when a difference between the second request based on a previous arbitration result and the second request based on a current arbitration result is larger than a threshold value, distribute a request that is a value between the second request based on the previous arbitration result and the second request based on the current arbitration result.

A method to be executed by a computer of a manager mounted on a vehicle according to another aspect of the present disclosure provided. The method includes: receiving a plurality of kinematic plans from a plurality of ADAS applications; arbitrating the plurality of kinematic plans; calculating a motion request based on a result of the arbitration; and distributing the motion request to at least one of a plurality of actuator systems, wherein when a difference between the motion request based on a previous arbitration result and the motion request based on a current arbitration result is larger than a threshold value, distributing a request that is a value between the motion request based on the previous arbitration result and the motion request based on the current arbitration result.

Another aspect of the present disclosure provides a non-transitory storage medium storing instructions that are executable by a computer of a manager mounted on a vehicle and that cause the computer of the manager to perform functions comprising: receiving a plurality of kinematic plans from a plurality of ADAS applications; arbitrating the plurality of kinematic plans; calculating a motion request based on a result of an arbitration; and distributing the motion request to at least one of a plurality of actuator systems, wherein when a difference between the motion request based on a previous arbitration result and the motion request based on a current arbitration result is larger than a threshold value, distributing a request that is a value between the motion request based on the previous arbitration result and the motion request based on the current arbitration result.

An actuator system mounted on a vehicle according to another aspect of the present disclosure includes a communication device configured to receive, from a manager, a request that is a value between a motion request based on a previous arbitration result and a motion request based on a current arbitration result, when a difference between the motion request based on the previous arbitration result and the motion request based on the current arbitration result is larger than a threshold value. The manager includes one or more processors that is configured to receive a plurality of kinematic plans from a plurality of ADAS applications, arbitrate the plurality of kinematic plans, calculate a motion request based on an arbitration result, and distribute the motion request.

According to the control device, the manager, the method, the non-transitory storage medium, the actuator system, and the vehicle of the present disclosure, an instruction requesting a request value derived based on a guard value is generated when there is a request equal to or larger than the guard value from a driver assistance application. This restrains a significant change in vehicle's behavior from occurring when a current control command is switched to a new control command and the new control command is executed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart of a process that is performed by the vehicle control device.

DETAILED DESCRIPTION OF EMBODIMENTS

Embodiment

Figure 1:
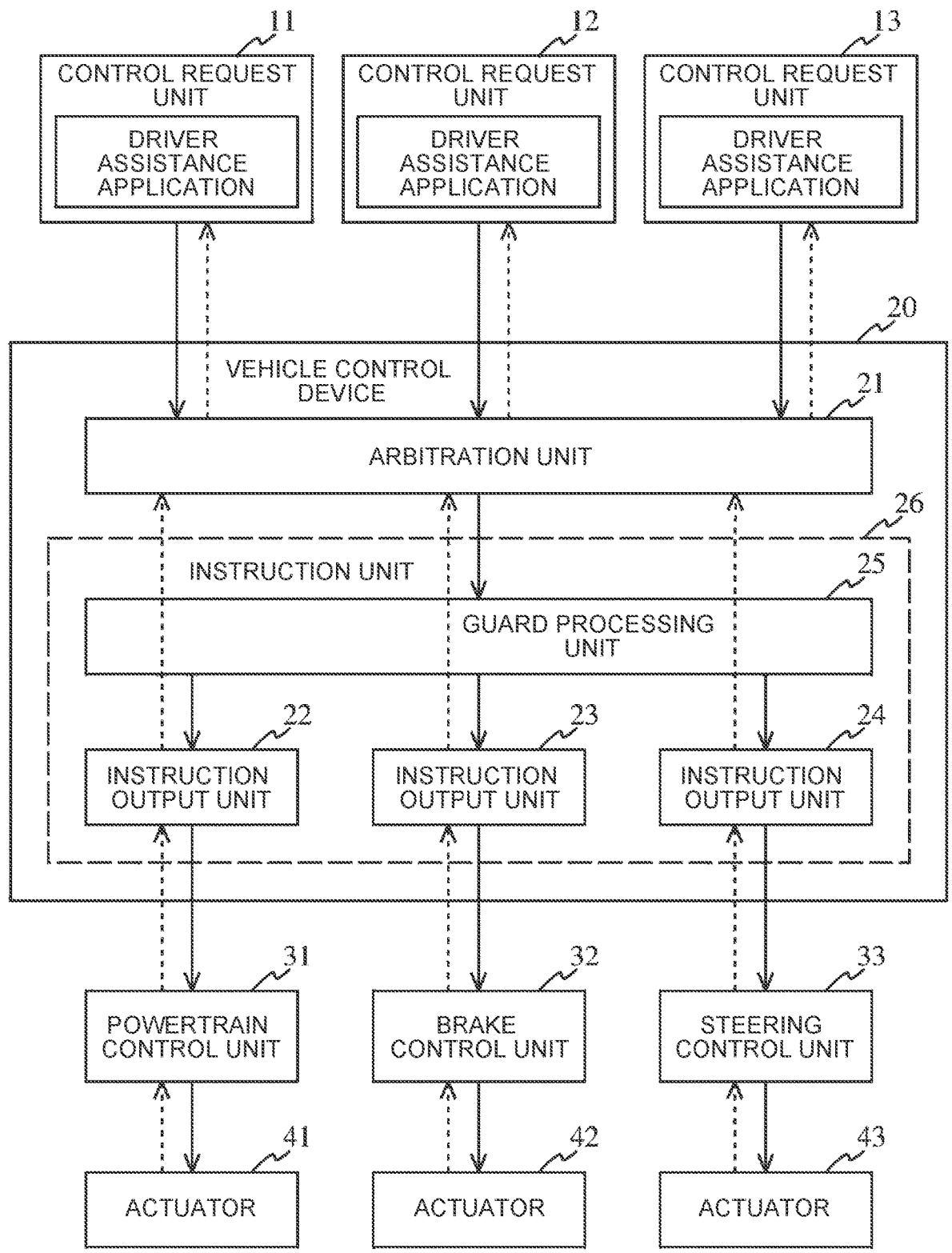
FIG. 1 is a functional block diagram of a vehicle control device and its peripheral units according to an embodiment.

A vehicle control device of the present disclosure arbitrates between or among a plurality of control commands received from a plurality of driver assistance applications. When there is a large divergence between a request value requested by a new control command adopted this time by the arbitration and a request value requested by an instruction based on a current control command adopted last time by the arbitration, the vehicle control device generates an instruction based on the control command resulting from the arbitration, using a guard value that is a positive value indicating an allowable upper limit of the absolute value of the amount of change in request value. This restrains a significant change in vehicle's behavior that will make the driver feel uncomfortable from occurring.

An embodiment of the present disclosure will be described in detail with reference to the accompanying drawings.

Configuration

FIG. 1 is a functional block diagram of a vehicle control device 20 and its peripheral units according to an embodiment of the present disclosure. The functional blocks illustrated in FIG. 1 include a plurality of control request units 11 to 13, the vehicle control device 20, a powertrain control unit 31, a brake control unit 32, a steering control unit 33, and actuators 41 to 43. These configurations are connected so that they can communicate with each other via an on-board network such as Controller Area Network (CAN) or Ethernet (registered trademark). Arrows in FIG. 1 schematically show an illustrative flow of information, and actual connection of communication lines is not limited.

Each of the control request units 11 to 13 is a configuration (driver assistance system) that executes a driver assistance application to request the actuators 41 to 43 to implement a driver assistance function for a vehicle such as autonomous driving and self-parking, adaptive cruise control, lane keep assist, or collision mitigation braking. The control request units 11 to 13 are implemented by a computer, such as electronic control unit (ECU), having a processor such as CPU and a memory. The control request units 11 to 13 implement different driver assistance functions and can operate simultaneously. The number of control request units mounted on the vehicle is not limited to three shown in FIG. 1, and may be two or less or four or more. The driver assistance devices (the control requesting units 11 to 13) are examples of driver assistance systems or ADAS applications.

The control request units 11 to 13 output control commands for requesting operations of the actuators 41 to 43 mounted on the vehicle. Each of the control request units 11 to 13 determines a part or all of control contents relating to vehicle motion such as "run," "turn," and "stop" according to its driver assistance function, and outputs the determined control content as a control command.

The control command is, e.g., a request value of motion in the traveling direction of the vehicle for "running" or "stopping," a request value of motion in the lateral direction of the vehicle for "turning," etc. The request value of motion in the traveling direction is specifically expressed by using, e.g., the acceleration of the vehicle in the traveling direction as a desired controlled variable. The request value of motion in the lateral direction is specifically expressed by using, e.g., the steering angle of a steering wheel as a desired controlled variable.

The control command can include a guard value (positive value). The guard value is a value indicating an allowable upper limit of the absolute value of the amount of change in request value. The guard value is determined corresponding to the request value. For example, the guard value is determined based on the amount of change in request value of motion in the traveling direction and the amount of change in request value of motion in the lateral direction which will not cause a significant change in vehicle's behavior that will make the driver feel uncomfortable. The guard value may be either a fixed value or a variable value. The guard value can be a variable value corrected based on the state of the vehicle such as speed or acceleration. For example, when the speed or acceleration is relatively low, the guard value can be corrected to a higher value to reduce the limitation on a change in vehicle's behavior. When the speed or acceleration is relatively high, the guard value can be corrected to a lower value to increase the limitation on a change in vehicle's behavior.

The vehicle control device 20 determines the control contents relating to vehicle motion such as "run," "turn," and "stop," based on the control commands from the control request units 11 to 13. Based on the determined control contents, the vehicle control device 20 sends necessary instructions to the powertrain control unit 31, the brake control unit 32, and the steering control unit 33 (and a shift control unit, not shown, for controlling the shift position). The vehicle control device 20 thus functions as either a motion manager that properly controls the actuators 41 to 43 associated with vehicle motion or a part of the motion manager to control vehicle motion. The vehicle control device 20 may be a device that exclusively controls motion in the lateral direction of the vehicle. The motion in the lateral direction of the vehicle is typically implemented by controlling steering of a steering system. Motion in the traveling direction of the vehicle is implemented by controlling generation of a braking force by a braking system and generation of a driving force or a braking force by a powertrain either solely or in combination. The vehicle control device 20 includes an arbitration unit 21, a guard processing unit 25, and a plurality of instruction output units 22 to 24. The vehicle control device 20 is implemented by a processor, a memory, etc. The vehicle control device 20 may include a plurality of ECUs, a plurality of processors, and a plurality of memories. The vehicle control device 20 is an example of a control device or a manager.

The arbitration unit 21 acquires the control commands from the control request units 11 to 13 and arbitrates among the acquired control commands. The control command is an example of a first request or a kinematic plan. The kinematic plan may be a vehicle motion or behavior plan including at least one of a longitudinal acceleration/deceleration, a curvature, a steering angle, and a yaw rate. As an arbitration process, the arbitration unit 21, e.g., selects one of the acquired control commands based on a predetermined selection criterion or sets a new control command based on the acquired control commands. The new control command is an example of a second request that has a physical quantity different from that of the first request. Further, the new control command is an example of a motion request. This arbitration result may be fed back from the arbitration unit 21 to each of the control request units 11 to 13. The arbitration unit 21 may perform the arbitration based on information from the powertrain control unit 31, the brake control unit 32, and the steering control unit 33, which will be described later, indicating the operating states of the actuators 41 to 43 or the availabilities of the actuators 41 to 43. The availabilities of the actuators 41 to 43 are the current available performance ranges of the actuators 41 to 43. The control command resulting from the arbitration of the arbitration unit 21 is output to the guard processing unit 25. Each pair of the powertrain control unit 31 and the actuator 41, the brake control unit 32 and the actuator 42, and the steering control unit 33 and the actuator 43 is an example of the actuator system.

Based on the control command (request value, guard value) resulting from the arbitration of the arbitration unit 21 and also on the state of the vehicle, the guard processing unit 25 determines a final request value that instructs one or more of the powertrain control unit 31, the brake control unit 32, and the steering control unit 33 to perform control relating to the vehicle motion requested by the driver assistance application(s). The determination of this request value is subjected to a limitation (guard process) based on a guard value corresponding to the request value. How to determine the request value will be described later. The guard processing unit 25 outputs the determined request value to the instruction output units 22 to 24.

In the example described above, the arbitration unit 21 acquires the guard values together with the request values as the control commands from the control request units 11 to 13. Alternatively, the arbitration unit 21 may acquire only the request values as the control commands from the control request units 11 to 13, and the guard processing unit 25 may generate a guard value (fixed value or variable value) corresponding to the request value, based on the request value resulting from the arbitration of the arbitration unit 21 and the state of the vehicle (speed, acceleration, etc.).

The instruction output unit 22 generates an instruction that instructs the actuator 41 included in the powertrain to generate a driving force or a braking force, based on the request value determined by the guard processing unit 25. The instruction output unit 22 outputs the generated instruction to the powertrain control unit 31.

The instruction output unit 23 generates an instruction that instructs the actuator 42 included in the braking system to generate a braking force, based on the request value determined by the guard processing unit 25. The instruction output unit 23 outputs the generated instruction to the brake control unit 32.

The instruction output unit 24 generates an instruction that instructs the actuator 43 included in an electric power steering (EPS) system to generate a steering angle, based on the request value determined by the guard processing unit 25. The instruction output unit 24 outputs the generated instruction to the steering control unit 33.

As shown in FIG. 1, one instruction unit 26 includes the guard processing unit 25, the instruction output unit 22, the instruction output unit 23, and the instruction output unit 24. That is, for example, one functional block performs the entire process of determining a request value based on the control command and generating an instruction based on the request value.

The powertrain control unit 31 controls the operation of the actuator 41 included in the powertrain to generate the driving force indicated by the instruction output unit 22. The actuator 41 is one of drive actuators. The powertrain control unit 31 is implemented by, e.g., any one of an engine control ECU, a hybrid control ECU, a transmission ECU, etc. or any combination thereof depending on the configuration of the powertrain. Although FIG. 1 illustrates the configuration in which the powertrain control unit 31 controls one actuator 41, the powertrain control unit 31 may control two or more actuators depending on the configuration of the powertrain of the vehicle. Examples of the actuator 41 included in the powertrain include an engine, a traction motor, a clutch, a transmission, and a torque converter. The powertrain control unit 31 acquires information on the operating state of the actuator 41, based on an output signal from the actuator 41 or a measured value of a sensor. Examples of the information on the operating state of the actuator 41 include information indicating the availability of the actuator 41 and information indicating a monitored value of the driving force being implemented by the actuator 41. The instruction output unit 22 acquires the information on the operating state of the actuator 41 acquired by the powertrain control unit 31.

The brake control unit 32 controls the actuator 42 that operates the braking system mounted on each wheel to generate the braking force indicated by the instruction output unit 23. The actuator 42 is one of braking actuators. This braking actuator includes a hydraulic brake and a regenerative brake of an in-wheel motor (IWM) etc. The brake control unit 32 is implemented by, e.g., a brake control ECU. The brake control unit 32 receives an output value of a wheel speed sensor mounted on each wheel. The brake control unit 32 acquires information on the operating state of the actuator 42, based on an output signal from the actuator 42 or a measured value of a sensor. Examples of the information on the operating state of the actuator 42 include information indicating the availability of the actuator 42, information indicating a monitored value of the braking force being implemented by the actuator 42, and information unique to the actuator 42 indicating whether the temperature of a brake pad is transitioning toward overheat. The instruction output unit 23 acquires the information on the operating state of the actuator 42 acquired by the brake control unit 32.

The steering control unit 33 controls the actuator 43 included in the EPS system to control the steering angle of the steering wheel. The actuator 43 is one of steering actuators. The steering control unit 33 is implemented by, e.g., a power steering control ECU. The steering control unit 33 acquires information on the operating state of the actuator 43, based on an output signal from the actuator 43 or a measured value of a sensor. Examples of the information on the operating state of the actuator 43 include information indicating the availability of the actuator 43 and information indicating a monitored value of the steering angle being implemented by the actuator 43. The instruction output unit 24 acquires the information on the operating state of the actuator 43 acquired by the steering control unit 33.

Control

The control that is performed by the vehicle control device 20 according to the present embodiment will be described with further reference to FIG. 2. FIG. 2 is a flowchart illustrating the control that is performed by the vehicle control device 20. For example, the control process shown in FIG. 2 can be executed in a predetermined cycle. As described above, the vehicle control device 20 may generate a guard value instead of acquiring guard values from the control request units 11 to 13. In the example described below, however, the vehicle control device 20 acquires request values together with guard values corresponding to the request values from the control request units 11 to 13.

Step S201: The arbitration unit 21 of the vehicle control device 20 acquires request values and guard values corresponding to the request values as the control commands output from the control request units 11 to 13, and arbitrates between or among the acquired control commands. For the control command relating to motion control in the lateral direction, the arbitration unit 21 acquires a steering angle as the request value and an allowable upper limit of the absolute value of the amount of change in steering angle as the guard value. For the control command relating to motion control in the traveling direction, the arbitration unit 21 acquires acceleration or deceleration as the request value and an allowable upper limit of the absolute value of the amount of change in acceleration or deceleration as the guard value. In the case where the arbitration unit 21 acquires only one control command from the control request units 11 to 13 during a certain waiting time, the arbitration unit 21 adopts this control command as a control command resulting from the arbitration. When the arbitration unit 21 finishes the arbitration, the routine proceeds to step S202.

Step S202: The guard processing unit 25 of the vehicle control device 20 computes the difference (=R2−R1) between a first request value R1 and a second request value R2. The first request value R1 is a request value requested by an instruction based on a control command (current control command) adopted last time by the arbitration of the arbitration unit 21, and the second request value R2 is a request value requested by a control command (new control command) adopted this time by the arbitration of the arbitration unit 21. By this calculation, the guard processing unit 25 can obtain the amount by which the request value will change when the current control command is directly switched to the new control command. When the guard processing unit 25 finishes the computation of the difference between the first and second request values R1, R2, the routine proceeds to step S203.

Step S203: The guard processing unit 25 of the vehicle control device 20 determines whether the absolute value (=|R2−R1|) of the difference between the first and second request values R1, R2 is equal to or larger than a guard value G of the second request value R2 requested by the new control command. The guard processing unit 25 can thus determine whether a change in vehicle's behavior that is greater than a change defined by the guard value G will occur when the current control command is directly switched to the new control command. When the absolute value of the difference between the first and second request values R1, R2 is equal to or larger than the guard value G (YES in step S203), the routine proceeds to step S204. When the absolute value of the difference between the first and second request values R1, R2 is smaller than the guard value G (NO in step S203), the routine proceeds to step S207.

Step S204: The guard processing unit 25 of the vehicle control device 20 determines whether the difference between the first and second request values R1, R2 is a positive value. That is, the guard processing unit 25 determines whether the second request value R2 is larger than the first request value R1. The guard processing unit 25 can thus determine the direction in which the request value is guarded. When the difference between the first and second request values R1, R2 is a positive value (the second request value R2 is larger than the first request value R1) (YES in step S204), the routine proceeds to step S205. When the difference between the first and second request values R1, R2 is a negative value (the second request value R2 is not larger than the first request value R1) (NO in step S204), the routine proceeds to step S206.

Step S205: The guard processing unit 25 of the vehicle control device 20 calculates the sum of the first request value R1 requested by the instruction based on the current control command and the guard value G requested by the new control command (calculates (R1+G)) and determines the calculated sum as a final request value. This final request value is between R1 and R2. When the guard processing unit 25 finishes the determination of the final request value, the routine proceeds to step S208.

Step S206: The guard processing unit 25 of the vehicle control device 20 subtracts the guard value G requested by the new control command from the first request value R1 requested by the instruction based on the current control command (calculates (R1−G)) and determines the calculated difference as a final request value. This final request value is between R1 and R2. When the guard processing unit 25 finishes the determination of the final request value, the routine proceeds to step S208.

Step S207: The guard processing unit 25 of the vehicle control device 20 determines the second request value R2 requested by the new control command as a final request value. When the guard processing unit 25 finishes the determination of the final request value, the routine proceeds to step S208.

The request value determined in steps S205 to S207 is stored in the memory etc. of the vehicle control device 20 each time the request value is determined, and is used as the first request value R1 requested by the instruction based on the current control command to calculate the absolute value of the difference between the first and second request values R1, R2 in the subsequent step S202.

Step S208: The instruction output units 22 to 24 of the vehicle control device 20 generate an instruction based on the request value determined by the guard processing unit 25, and output the generated instruction to at least one of the powertrain control unit 31, the brake control unit 32, and the steering control unit 33 as an instruction based on the control command resulting from the arbitration. In the case where the instruction is about control of the steering angle, the instruction output unit 24 outputs the instruction to the steering control unit 33. In the case where the instruction is about control of the acceleration or deceleration, either or both of the instruction output units 22, 23 output the instruction to either or both of the powertrain control unit 31 and the brake control unit 32. The process is thus completed.

Functions and Effects

As described above, the vehicle control device according to the embodiment of the present disclosure arbitrates between or among a plurality of control commands received from a plurality of driver assistance applications, and then generates an instruction based on the control command resulting from the arbitration, according to the request value derived based on the guard value (positive value) indicating the allowable upper limit of the absolute value of the amount of change in request value.

Even when there is a large divergence between the request value requested by a new control command adopted this time by the arbitration and the request value requested by an instruction based on a current control command adopted last time by the arbitration, the above control restrains a significant change in vehicle's behavior that will make the driver feel uncomfortable from occurring when the current control command is switched to the new control command and the new control command is executed.

Although one embodiment of the technique of the present disclosure is described above, the present disclosure can be regarded as a vehicle control device, a control method that is performed by the vehicle control device including a processor and a memory, a control program for performing the control method, a computer-readable non-transitory storage medium storing the control program, a system including the vehicle control device, an application execution unit, an actuator control unit, and an actuator, or a vehicle equipped with the system.

The present disclosure is applicable to devices that control vehicle motion.

The disclosure can be also used as the following aspects. A vehicle control device according to another aspect of the present disclosure includes a one or more processors. The one or more processors are configured to: arbitrate between or among a plurality of control commands acquired from a plurality of driver assistance applications each implementing a driver assistance function; output, based on the control command resulting from the arbitration, an instruction for an electronic control unit configured to control an actuator mounted on a vehicle; when an absolute value of a difference between a request value requested by the instruction based on a current control command adopted last time by the arbitration and a request value requested by a new control command adopted this time by the arbitration is equal to or larger than a guard value indicating an allowable upper limit of an absolute value of an amount of change in the request value, output to the electronic control unit an instruction that requests a request value derived based on the guard value as the instruction based on the control command resulting from the arbitration.

In the vehicle control device, the one or more processors may be configured to acquire the request value and the guard value corresponding to the request value as the control command from the driver assistance application.

In the vehicle control device, the one or more processors may be configured to acquire the request value as the control command from the driver assistance application. The one or more processors may be configured to generate the guard value corresponding to the acquired request value.

In the vehicle control device, the one or more processors may be configured to, when an absolute value of a difference between a first request value and a second request value is smaller than a guard value corresponding to the second request value, output to the electronic control unit an instruction requesting the second request value as the instruction based on the control command resulting from the arbitration, the first request value being the request value requested by the instruction based on the current control command, and the second request value being the request value requested by the new control command. The one or more processors may be configured to, when the absolute value of the difference between the first request value and the second request value is equal to or larger than the guard value corresponding to the second request value and the second request value is larger than the first request value, output to the electronic control unit an instruction requesting a sum of the first request value and the guard value corresponding to the second request value as the instruction based on the control command resulting from the arbitration, and when the absolute value of the difference between the first request value and the second request value is equal to or larger than the guard value corresponding to the second request value and the second request value is not larger than the first request value, output to the electronic control unit an instruction requesting the first request value minus the guard value corresponding to the second request value as the instruction based on the control command resulting from the arbitration.

In the vehicle control device, the request value may be a steering angle. The one or more processor may be configured to output, to the electronic control unit that is able to control a steering actuator, an instruction based on the steering angle as the instruction based on the control command resulting from the arbitration.

In the vehicle control device, the request value may be acceleration. The one or more processor may be configured to output, to the electronic control unit that is able to control either or both of a brake actuator and a drive actuator, an instruction based on the acceleration as the instruction based on the control command resulting from the arbitration.

In the vehicle control device, the one or more processors may be configured to correct the guard value according to a vehicle speed or an acceleration.

Another aspect of the present disclosure is a method for controlling a vehicle. The method includes: arbitrating, by one or more processors, between or among a plurality of control commands acquired from a plurality of driver assistance applications each implementing a driver assistance function, computing, by the one or more processors, an absolute value of a difference between a request value requested by an instruction based on a current control command adopted last time by the arbitration and a request value requested by a new control command adopted this time by the arbitration; and when the absolute value of the difference between the request values is equal to or larger than a guard value indicating an allowable upper limit of an absolute value of an amount of change in the request value, outputting, to an electronic control unit configured to control an actuator mounted on the vehicle, an instruction that requests a request value derived based on the guard value as an instruction based on the control command resulting from the arbitration.

Another aspect of the disclosure is a non-transitory storage medium storing instructions that are executable by one or more processors included in a vehicle control device and that cause the one or more processors to perform functions. The functions include: arbitrating between or among a plurality of control commands acquired from a plurality of driver assistance applications each implementing a driver assistance function; computing an absolute value of a difference between a request value requested by an instruction based on a current control command adopted last time by the arbitration and a request value requested by a new control command adopted this time by the arbitration; and when the absolute value of the difference between the request values is equal to or larger than a guard value indicating an allowable upper limit of an absolute value of an amount of change in the request value, outputting, to an electronic control unit configured to control an actuator mounted on a vehicle, an instruction that requests a request value derived based on the guard value as an instruction based on the control command resulting from the arbitration.

What is claimed is:

1. A control device mounted on a vehicle, the control device comprising one or more processors configured to:
   receive a plurality of requests from a driver assistance system;
   arbitrate the plurality of requests;
   calculate a first command, which has a physical quantity different from a corresponding one of the requests, based on a first arbitration result;
   distribute the first command to at least one of a plurality of actuator systems;
   calculate a later command, which has a physical quantity different from a corresponding one of the requests, based on a later arbitration result; and
   when a difference between the first command and the later command is larger than a threshold value, distribute an adjusted command that is a value between the first command and the later command.

2. A manager mounted on a vehicle, the manager comprising one or more processors configured to:
   receive a plurality of kinematic plans from a plurality of ADAS applications;
   arbitrate the plurality of kinematic plans;
   calculate a first motion request based on a first arbitration result;
   distribute the first motion request to at least one of a plurality of actuator systems;
   calculate a later motion request based on a Later arbitration result; and
   when a difference between the first motion request and the later motion request is larger than a threshold value, distribute an adjusted motion request that is a value between the first motion request and the later motion request.

3. A manager mounted on a vehicle, the manager comprising one or more processors configured to:
   receive a plurality of requests from a plurality of ADAS applications;
   arbitrate the plurality of requests;
   calculate a first command, which has a physical quantity different from a corresponding one of the requests, based on a first arbitration result;
   distribute the first command to at least one of a plurality of actuator systems;
   calculate a later command, which has a physical quantity different from a corresponding one of the requests, based on a later arbitration result; and
   when a difference between the first command and the later command is larger than a threshold value, distribute an adjusted command that is a value between the first command and the later command.

4. A method to be executed by a computer of a manager mounted on a vehicle, the method comprising:
   receiving a plurality of kinematic plans from a plurality of ADAS applications;
   arbitrating the plurality of kinematic plans;
   calculating a first motion request based on a first result of the arbitration;
   distributing the first motion request to at least one of a plurality of actuator systems;
   calculating a later motion request based on a later result of the arbitration; and
   when a difference between the first motion request and the later motion request is larger than a threshold value, distributing an adjusted motion request that is a value between the first motion request and the second motion request.

5. A non-transitory storage medium storing instructions that are executable by a computer of a manager mounted on a vehicle and that cause the computer of the manager to perform functions comprising:
   receiving a plurality of kinematic plans from a plurality of ADAS applications;
   arbitrating the plurality of kinematic plans;
   calculating a first motion request based on a first result of an arbitration;
   distributing the first motion request to at least one of a plurality of actuator systems;
   calculating a later motion request based on a later result of the arbitration; and
   when a difference between the first motion request and the later motion request is larger than a threshold value, distributing an adjusted motion request that is a value between the first motion request and the second motion request.

6. An actuator system mounted on a vehicle, the actuator system comprising:
   a communication device configured to:
      receive, from a manager, an adjusted motion request that is a value between a first motion request based on a first arbitration result and a later motion request based on a later arbitration result, when a difference between the first motion request and the later motion request is larger than a threshold value,
   wherein the manager includes one or more processors configured to:
      receive a plurality of kinematic plans from a plurality of ADAS applications;
      arbitrate the plurality of kinematic plans;
      calculate the first motion request and the second motion request; and
      distribute the adjusted motion request to the communication device.

7. A vehicle on which the manager according to claim 2 is mounted.

* * * * *